(12) United States Patent
Proctor (10) Patent No.: US 7,786,981 B2
(45) Date of Patent: Aug. 31, 2010

(54) CIRCULAR TOUCH SENSOR

(75) Inventor: David W. Proctor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 11/928,524

(22) Filed: Oct. 30, 2007

(65) Prior Publication Data

US 2008/0047765 A1    Feb. 28, 2008

Related U.S. Application Data

(63) Continuation of application No. 11/102,599, filed on Apr. 7, 2005, now abandoned.

(51) Int. Cl.
*G06F 3/044* (2006.01)
(52) U.S. Cl. ............... 345/173; 345/156; 345/174; 345/175; 345/176; 178/18.01; 178/18.07
(58) Field of Classification Search ......... 345/173–177; 178/18.01–18.07
See application file for complete search history.

(56) References Cited

U.S. PATENT DOCUMENTS

| 4,264,903 | A | * | 4/1981 | Bigelow | 341/1 |
|---|---|---|---|---|---|
| 4,736,191 | A | * | 4/1988 | Matzke et al. | 341/20 |
| 5,546,106 | A | * | 8/1996 | Walgers | 345/184 |
| 5,736,865 | A | * | 4/1998 | Nelson et al. | 324/660 |
| 5,781,178 | A | * | 7/1998 | Roehm et al. | 345/157 |
| 7,046,230 | B2 | * | 5/2006 | Zadesky et al. | 345/156 |
| 7,312,785 | B2 | * | 12/2007 | Tsuk et al. | 345/156 |
| 7,466,307 | B2 | * | 12/2008 | Trent et al. | 345/173 |
| 2004/0252109 | A1 | | 12/2004 | Trent, Jr. et al. | |
| 2005/0110768 | A1 | | 5/2005 | Marriott et al. | |
| 2005/0270039 | A1 | * | 12/2005 | Mackey | 324/660 |

* cited by examiner

*Primary Examiner*—Sumati Lefkowitz
*Assistant Examiner*—Grant D Sitta
(74) *Attorney, Agent, or Firm*—Lee & Hayes, PLLC (57) ABSTRACT

A circular touch sensor has three or more sensors arranged in an iris pattern. Each pad is defined by continuous edges that spiral outward about a center point. The unique geometric shape allows measurement of relative amounts of contact on adjoining sensors. In one implementation, the sensors measure relative capacitance of two or more sensors, thereby enabling high precision identification of the point of contact. With as few as three pads, the circular touch sensor is less expensive than traditional 12-pad to 16-pad circular sensors.

11 Claims, 7 Drawing Sheets

CIRCULAR TOUCH SENSOR

REFERENCE TO EARLIER APPPLICAITON

This is a continuation of U.S. patent application Ser. No. 11/102,599, entitled "Circular Touch Sensor", filed Apr. 7, 2005, which is incorporated by reference.

TECHNICAL FIELD

This disclosure relates to touch sensors, and particularly circular touch sensors.

BACKGROUND

Touch sensors are used in many electronic and computing devices. Many laptops, for example, are equipped with a rectangular touch sensor that functions like a computer mouse to control pointer positioning on a screen and permit entry of commands. The touch sensor detects the user's touch and generates signals representing a location of contact on the sensor.

Figure 1:
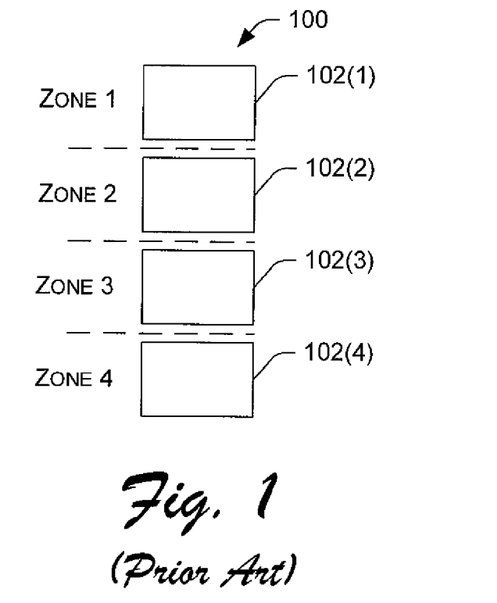
FIG. 1 illustrates a conventional linear touch sensor with straight edges between adjacent sensor pads.

FIG. 1 shows a conventional linear touch sensor 100. For discussion purposes, the sensor 100 is illustrated with four rectangular sensor pads 102(1), 102(2), 102(3), and 102(4) that are linearly aligned. This arrangement allows detection of a user's touch within four discrete zones 1-4 that correspond with the four sensor pads 102(1)-102(4).

Figure 2:
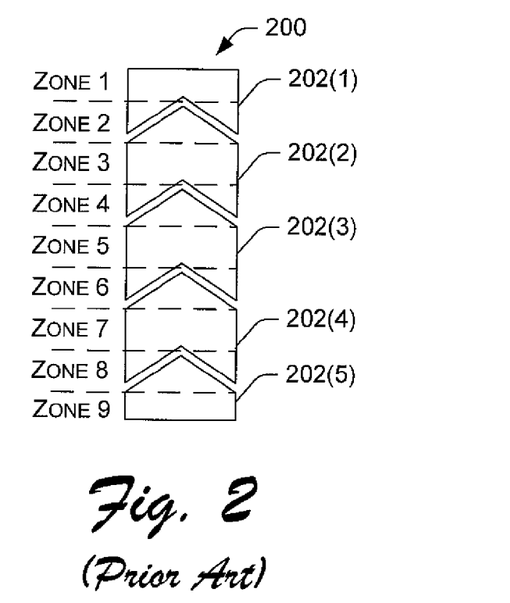
FIG. 2 illustrates a conventional linear touch sensor with jagged edges between adjacent sensor pads.

To increase precision, additional detection zones may be created by changing the shape of the sensor pads. FIG. 2 shows another conventional linear touch sensor 200 having five discrete sensor pads 202(1)-202(5), where each sensor pad has a non-rectangular shape. Edges between adjacent sensor pads are discontinuous or jagged. This shape allows adjoining sensor pads to interlace with one another to define additional detection zones, so that there are more zones than sensor pads. In this example, there are nine detection zones 1-9 for five sensor pads. With this arrangement, a single touch in zone 2 is detected by adjacent sensor pads 202(1) and 202(2), whereas a touch in zone 1 is detected solely by the top sensor pad 202(1).

Figure 3:
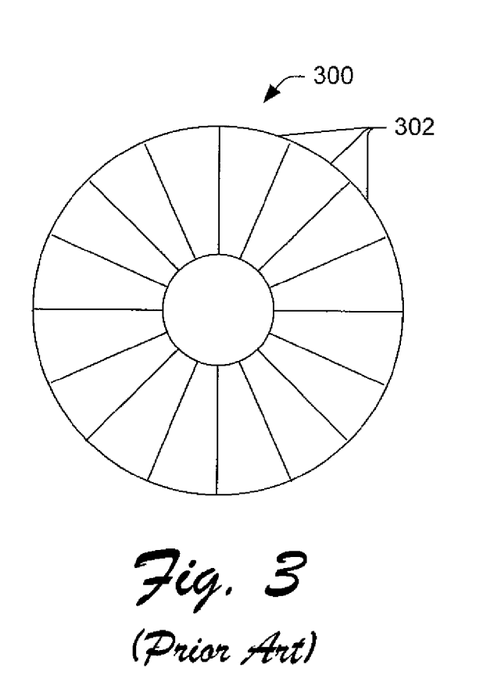
FIG. 3 illustrates a conventional circular touch sensor with straight edges between adjacent sensor pads.
Figure 4:
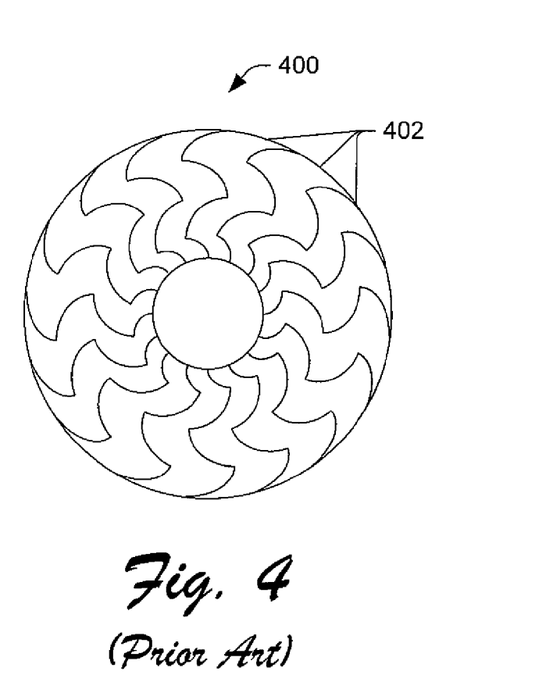
FIG. 4 illustrates a conventional circular touch sensor with jagged edges between adjacent sensor pads.

Many devices today use non-rectangular touch sensors. For instance, some popular audio devices (e.g., MP3 players) employ circular touch sensors. These sensors have traditionally followed the same design as linear sensors, with multiple discrete sensor pads (e.g., 12-16 sensors) aligned side-by-side. FIG. 3 shows a conventional circular sensor 300 having sixteen discrete sensor pads 302 extending radially outward from the center. To increase precision, the edges between the sensor pads may be made jagged. FIG. 4 shows one example circular sensor 400 having multiple sensor pads 402 with jagged edges. Sixteen pads 402 are shown, but there may be fewer (e.g., 12).

These conventional sensors detect presence or absence of a finger on each sensor pad. Past solutions to increase precision have been to increase the number of sensor pads or make the edges jagged to define extra detection zones. However, larger numbers of sensor pads requires more expensive and complex interfaces to convert the detection signals to a smaller number of output pins on circuit chips. Moreover, even as the number of sensor pads increase the sensors still detect only a finite number of contact positions.

In addition to precision, manufacturing cost is another important consideration for designers of touch sensors. These designers continually look for ways to reduce cost. Conventional circular touch sensors employ anywhere from 12 to 16 sensors, thereby increasing component costs.

Accordingly, there remains a need for an improved circular touch sensor that is inexpensive to produce, yet provides high accuracy and precision similar to that of conventional 16-pad sensors.

SUMMARY

A circular touch sensor has three or more sensors arranged in an iris pattern. Each pad is defined by continuous edges that spiral outward about a center point. The unique geometric shape allows measurement of relative amounts of contact on adjoining sensors. In one implementation, the sensors measure relative capacitance of two or more sensors, thereby enabling high precision identification of the point of contact. With as few as three pads, the circular touch sensor is less expensive than traditional 12-pad to 16-pad circular sensors.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to circular touch sensors. The circular touch sensor has three or more sensor pads arranged in an iris pattern. The sensor pads measure relative presence of a user's finger (or other pointing member) on adjoining sensor pads. The sensor pads may measure, for example, relative capacitance or pressure on adjoining pads, although other technologies that output variable signals indicative of the degree of contact may be used. The unique geometric shape and measurement of relative contact position on adjoining sensor pads enables high precision detection with far fewer sensor pads than the traditional 12-pad to 16-pad sensors. Since the sensor can be implemented with as few as three sensors, the circular touch sensor is less expensive than the conventional circular sensors.

For discussion purposes, the circular touch sensor is described in the context of consumer electronic devices, such as portable entertainment devices, portable digital assistants (PDAs), cellular phones, audio players, video players, notebook computers, digital cameras, laptop computers, and the like. One example implementation is shown below in FIG. 5. However, the circular touch sensor can be implemented in other types of devices and in different environments.

Portable Entertainment Device

Figure 5:
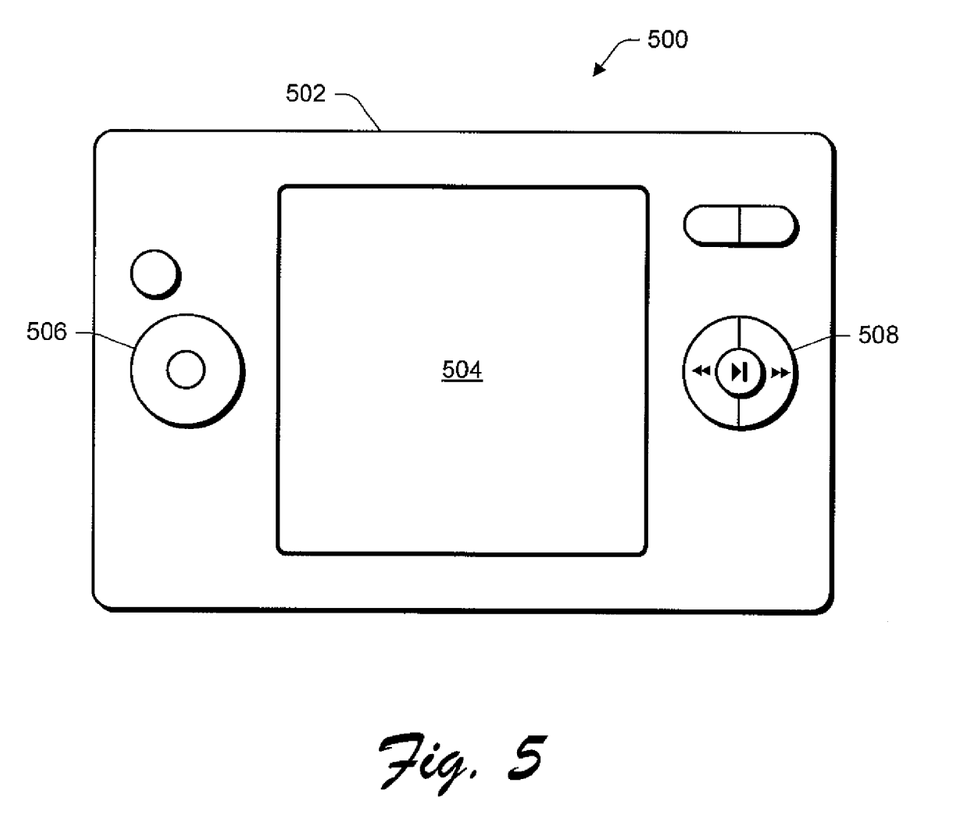
FIG. 5 illustrates a portable entertainment device that implements a circular touch sensor.

FIG. 5 shows a portable entertainment device 500 configured as a Portable Media Center™ device supported by Microsoft Corporation. The device 500 is a multifunction device having memory and processing capabilities to play music and videos, depict still images, download content from the Internet, and the like.

Device 500 has a body or casing 502 and a display panel 504 mounted centrally of the casing 502. The display panel 504 is a flat panel, color display with sufficient resolution to depict digital images or motion video. The display panel may be optionally implemented with a touch screen overlaying the display to facilitate user input. The display panel may be implemented using different technologies, including LCD (liquid crystal display) and OLED (organic light emitting diode).

A circular touch sensor 506 is positioned left of the display panel 504 to support user control of the device 500. Shuttle control buttons 508 are positioned right of the display panel 504 to control video playback. One or more other buttons may also be provided to facilitate other control functions, such as volume, brightness, contrast, and so forth. It is noted that the device 500 is just one exemplary implementation, and that other configurations and layouts, with more or less buttons and features, may be used.

The circular touch sensor 506 has three or more sensor pads arranged in a geometric pattern with continuous, arcuate edges. This allows the sensor pads to measure a ratio of finger contact across adjoining pads. While the touch sensor 506 is illustrated in a circular shape, it is noted that the sensor 506 may take on other non-circular shapes. Possible example shapes include ovals, star-like patterns, and polygons.

Sensor

Figure 6:
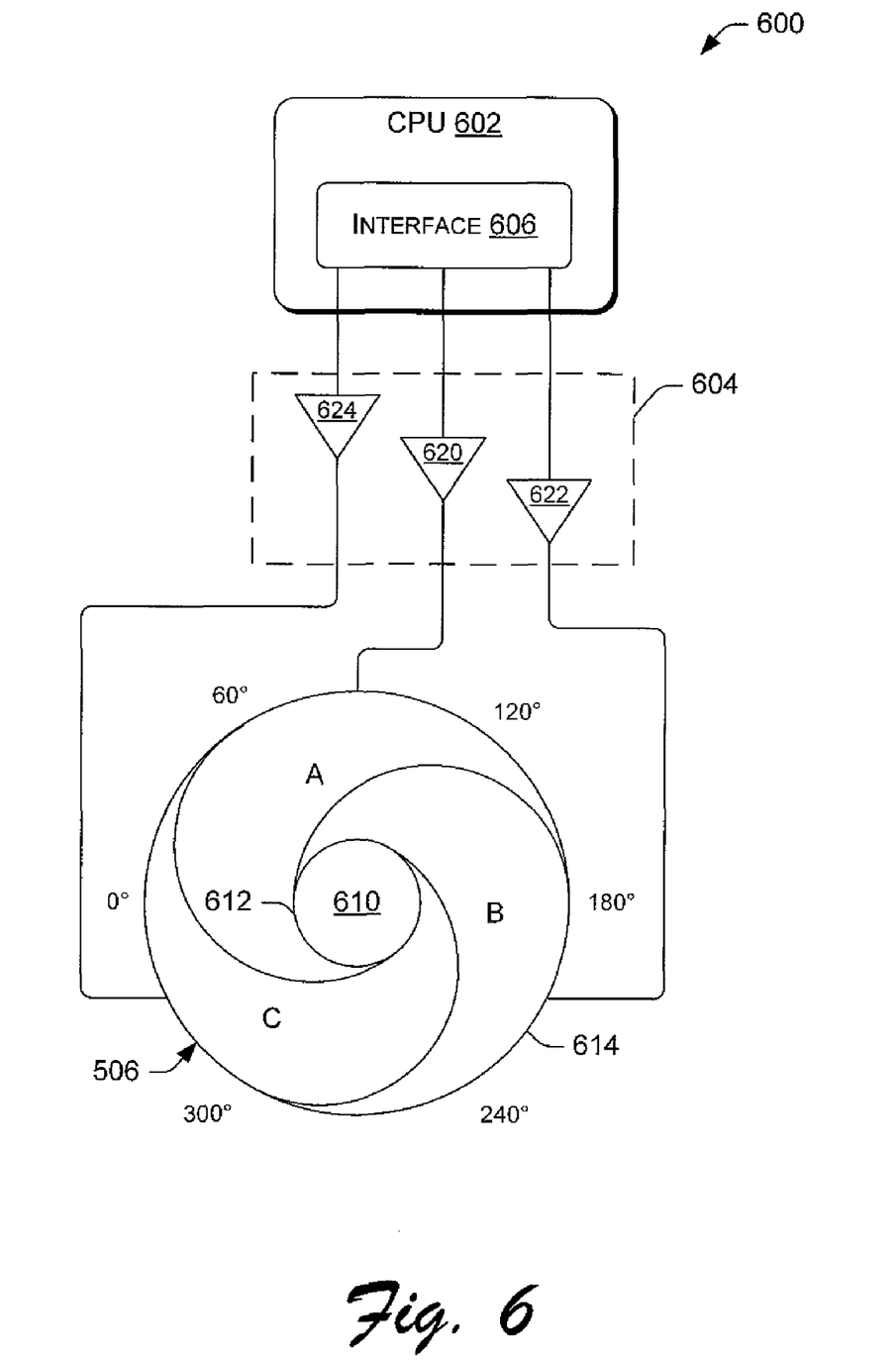
FIG. 6 illustrates the circular touch sensor implemented in a system architecture, which may be implemented, for example, in the portable entertainment device of FIG. 5. The circular touch sensor has three sensor pads arranged according to a first implementation.

FIG. 6 shows a circular touch sensor in a system architecture 600 that might be implemented, for example, in the portable entertainment device 500. The circular touch sensor 506 is coupled to a microcontroller or CPU (central processing unit) 602 via capacitance detection circuitry 604 and an interface 606. The interface 606 may be implemented as software running on the CPU 602 or as a hardware interface. When a user or other object (e.g., stylus) contacts the circular touch sensor 506, the capacitance detection circuitry 604 detects changes in capacitance as an indication of contact. The circuitry 604 generates signals that are passed to the CPU 602 for determination of a location of the touch on the circular sensor 506.

The circular touch sensor 506 is illustrated with three sensor pads A, B, C and a center region 610. The pads A, B, C are arranged in a geometric pattern about a center point within the center region 610. Each pad is defined by continuous, arcuate edges that spiral from an inner boundary 612 defined by the center region 610 outward to an outer boundary 614 of the sensor 506. In this arrangement, the sensor pads A, B, C form an iris pattern, where each sensor pad defines or covers approximately one-third of a contact region defined between the inner and outer boundaries.

The sensor pads A, B, C overlap one another such that any radius from the sensor's center crosses over at least two sensor pads. In this example, each pad edge originates at a first point on the inner boundary 612 and terminates at a second point on the outer boundary 614, where the first and second points are approximately 180° apart. For instance, an edge separating pads A and B originates at a point on the inner boundary 612 at 0° and terminates at a point on the outer boundary 614 at 180°. In this manner, a user's finger is likely to contact two adjoining sensor pads at any point on the circular touch sensor 506.

For capacitance detection, the pads A, B, C are formed of metal or other electrically conductive material. Contact with pad A causes a capacitance change that is detected by an associated capacitance meter 620 of the capacitance detection circuitry 604. Similarly, contact on pads B and C induce capacitance changes that are detected by associated capacitance meters 622 and 624, respectively. The capacitance meters 620-624 generated values indicative of capacitance (or capacitance change), which are passed to the interface 606.

With the iris-pattern arrangement, the user is likely to touch two pads concurrently. The interface 606 and/or CPU 602 determines the position of the user's finger on the circular touch sensor 506 based on the values from the capacitance meters 620-624 associated with the pads A-C. The interface 606 and/or CPU 602 computes a ratio of values generated by pads being contacted. The ratio accurately identifies the angle at which contact is made on the circular sensor. In this manner, the CPU 602, circuitry 604, and interface 606 define a means for detecting contact made to one or more of the sensors and determining a location of the contact.

As one example technique, there is a baseline value when no finger or pointing mechanism is present on the sensor pads. The baselines value can be established at design, or set through a calibration process. When a finger or pointing mechanism comes in contact with the sensor arrangement, there is an increase in capacitance across all sensors above the baseline value. The position of contact is determined by comparing the relative contribution of each sensor pad to the total capacitance increase across all sensors above the baseline value. A table may be compiled with various sensor values for corresponding finger positions, and the interface 606 may look up the position from the values in table 1 below.

TABLE 1

| Position | A | B | C | TOTAL | A % | B % | C % |
|---|---|---|---|---|---|---|---|
| 0 | 1.00 | 0.00 | 0.50 | 1.50 | 0.667 | 0.000 | 0.333 |
| 10 | 1.00 | 0.08 | 0.42 | 1.50 | 0.667 | 0.056 | 0.278 |
| 20 | 1.00 | 0.17 | 0.33 | 1.50 | 0.667 | 0.111 | 0.222 |
| 30 | 1.00 | 0.25 | 0.25 | 1.50 | 0.667 | 0.167 | 0.167 |
| 40 | 1.00 | 0.33 | 0.17 | 1.50 | 0.667 | 0.222 | 0.111 |
| 50 | 1.00 | 0.42 | 0.08 | 1.50 | 0.667 | 0.278 | 0.056 |
| 60 | 1.00 | 0.50 | 0.00 | 1.50 | 0.667 | 0.333 | 0.000 |
| 70 | 0.92 | 0.58 | 0.00 | 1.50 | 0.611 | 0.389 | 0.000 |
| 80 | 0.83 | 0.67 | 0.00 | 1.50 | 0.556 | 0.444 | 0.000 |
| 90 | 0.75 | 0.75 | 0.00 | 1.50 | 0.500 | 0.500 | 0.000 |
| 100 | 0.67 | 0.83 | 0.00 | 1.50 | 0.444 | 0.556 | 0.000 |
| 110 | 0.58 | 0.92 | 0.00 | 1.50 | 0.389 | 0.611 | 0.000 |
| 120 | 0.50 | 1.00 | 0.00 | 1.50 | 0.333 | 0.667 | 0.000 |
| 130 | 0.42 | 1.00 | 0.08 | 1.50 | 0.278 | 0.667 | 0.056 |
| 140 | 0.33 | 1.00 | 0.17 | 1.50 | 0.222 | 0.667 | 0.111 |
| 150 | 0.25 | 1.00 | 0.25 | 1.50 | 0.167 | 0.667 | 0.167 |
| 160 | 0.17 | 1.00 | 0.33 | 1.50 | 0.111 | 0.667 | 0.222 |
| 170 | 0.08 | 1.00 | 0.42 | 1.50 | 0.056 | 0.667 | 0.278 |

TABLE 1-continued

| Position | A | B | C | TOTAL | A % | B % | C % |
|---|---|---|---|---|---|---|---|
| 180 | 0.00 | 1.00 | 0.50 | 1.50 | 0.000 | 0.667 | 0.333 |
| 190 | 0.00 | 0.92 | 0.58 | 1.50 | 0.000 | 0.611 | 0.389 |
| 200 | 0.00 | 0.83 | 0.67 | 1.50 | 0.000 | 0.556 | 0.444 |
| 210 | 0.00 | 0.75 | 0.75 | 1.50 | 0.000 | 0.500 | 0.500 |
| 220 | 0.00 | 0.67 | 0.83 | 1.50 | 0.000 | 0.444 | 0.556 |
| 230 | 0.00 | 0.58 | 0.92 | 1.50 | 0.000 | 0.389 | 0.611 |
| 240 | 0.00 | 0.50 | 1.00 | 1.50 | 0.000 | 0.333 | 0.667 |
| 250 | 0.08 | 0.42 | 1.00 | 1.50 | 0.056 | 0.278 | 0.667 |
| 260 | 0.17 | 0.33 | 1.00 | 1.50 | 0.111 | 0.222 | 0.667 |
| 270 | 0.25 | 0.25 | 1.00 | 1.50 | 0.167 | 0.167 | 0.667 |
| 280 | 0.33 | 0.17 | 1.00 | 1.50 | 0.222 | 0.111 | 0.667 |
| 290 | 0.42 | 0.08 | 1.00 | 1.50 | 0.278 | 0.056 | 0.667 |
| 300 | 0.50 | 0.00 | 1.00 | 1.50 | 0.333 | 0.000 | 0.667 |
| 310 | 0.58 | 0.00 | 0.92 | 1.50 | 0.389 | 0.000 | 0.611 |
| 320 | 0.67 | 0.00 | 0.83 | 1.50 | 0.444 | 0.000 | 0.556 |
| 330 | 0.75 | 0.00 | 0.75 | 1.50 | 0.500 | 0.000 | 0.500 |
| 340 | 0.83 | 0.00 | 0.67 | 1.50 | 0.556 | 0.000 | 0.444 |
| 350 | 0.92 | 0.00 | 0.58 | 1.50 | 0.611 | 0.000 | 0.389 |
| 360 | 1.00 | 0.00 | 0.50 | 1.50 | 0.667 | 0.000 | 0.333 |

From table 1, a point of contact is deemed to be positioned at 60° when the contribution of pad A to the total increase above the baseline is approximately ⅔ (0.667) and the contribution of pad B to the total increase above the baseline is approximately ⅓ (0.333). Additionally, the interface 606 can use the table to interpolate between listed positions. Thus, the point of contact is deemed to be positioned at 55° on the circular touch sensor when pad A's contribution is approximately 0.667 to the total capacitance increase above the baseline, pad B's contribution is approximately 0.305, and pad C's contribution is approximately 0.028. With interpolation, the circular touch sensor 506 essentially functions as an infinitely variable sensor that senses infinitely many finger positions.

Center region 610 may also define a fourth pad. In this implementation, circuitry 604 is equipped with a fourth capacitance meter to detect contact with the center region 610. The center region 610 may be associated with a "select" or "OK" command.

Figure 7:
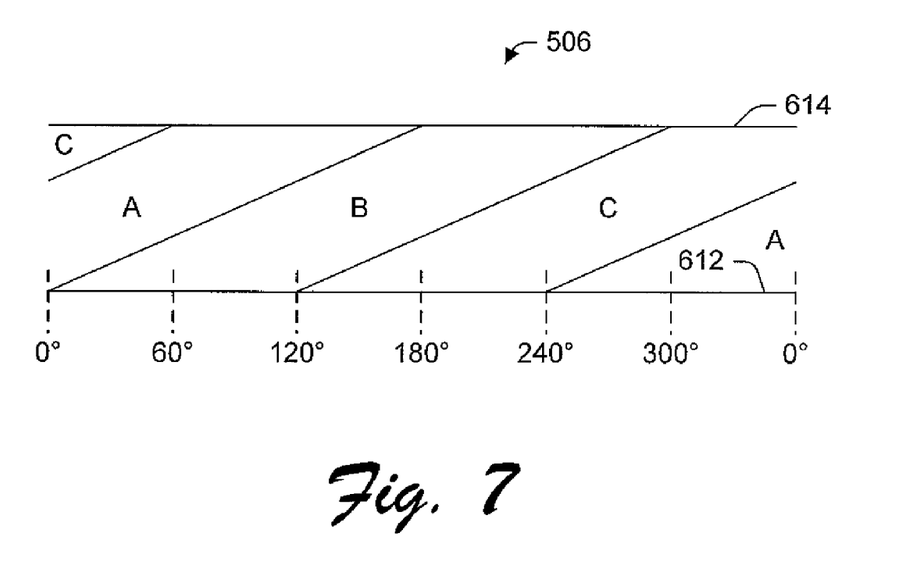
FIG. 7 illustrates the circular touch sensor of FIG. 6 as it would appear if uncoiled and stretched out linearly.

FIG. 7 shows the pads A-C of the circular touch sensor 506 uncoiled and stretched out linearly. The inner boundary 612 extends along the bottom and the outer boundary 614 extends along the top. This illustration demonstrates the overlapping relationship of the pads. Contact sensed at a position of 0° is manifest by pad A contributing ⅔ (0.667) to the total increase above the baseline and pad C contributing ⅓ (0.333) to the total capacitance increase above the baseline. Contact sensed at a position of 240° is manifest by pad C contributing ⅔ (0.667) to the total increase above the baseline and pad B contributing ⅓ (0.333) to the total increase above the baseline.

Notice also that there are locations on the sensor where three pads may detect presence of the user's finger, such as positions between 0° and 60°, and between 120° and 180°, and between 240° and 300°. As the user's finger moves along the sensor pads, the ratios of capacitance values generated by adjoining pads in contact with the finger vary continuously, providing very accurate position detection. The continuous ratio variance results from the smooth arcuate edges that spiral outward from the center region. This arrangement allows the circular touch sensor to effectively detect infinitely many positions, which is an improvement over discrete sensors that are capable of detecting only a finite number of positions.

One particular implementation for detecting position using variable ratios of adjoining pads is described in U.S. patent application Ser. No. 09/820,747, which was filed Mar. 30, 2001, and is assigned to Microsoft Corporation. This Application is hereby incorporated by reference. Additionally, the above implementation is described as measuring capacitance to detect position. It is noted that the circular sensor may be implemented using other technologies, including pressure sensing technology. The circular sensor with an iris-shaped pad arrangement may be implemented with essentially any technology that measures variability of contact (e.g., 0→1), as opposed to a binary determination of presence or non-presence (e.g., 0 or 1).

The pad layout shown in FIGS. 6 and 7 is one possible layout, and suitable for sensors having a radial width between the inner boundary 612 and the outer boundary 614 that is approximately the size of the user's finger. If the radial width is greater than a finger width, the pattern may be repeated radially to avoid affecting any measurement that might be caused by radial movement of the finger.

Figure 8:
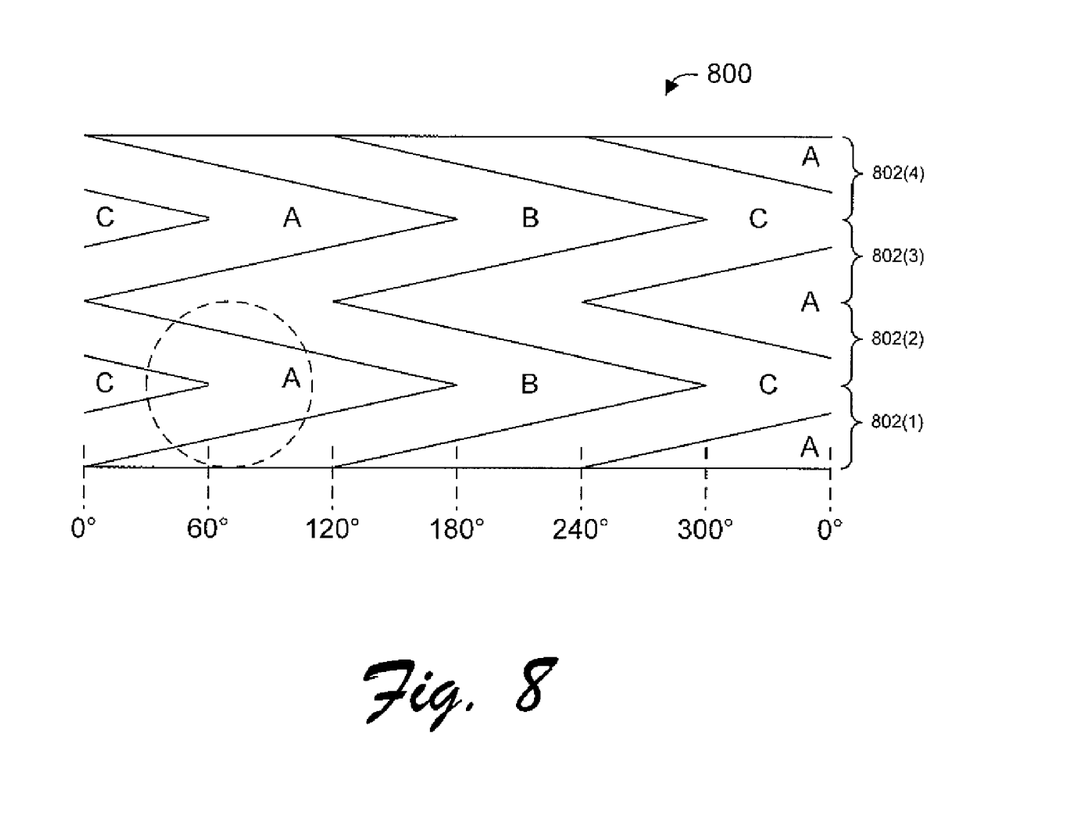
FIG. 8 illustrates a circular touch sensor in which the pad arrangement shown in FIG. 7 is replicated multiple times.

FIG. 8 shows a linear version of a circular touch sensor 800 where the iris pattern of three pads is repeated multiple times in the radial direction. In this example, the iris pattern of pads A-C, as represented in the linear version shown in FIG. 7, is repeated four times as represented by horizontal bands 802(1), 802(2), 802(3), and 802(4). Each band is set apart by intermediate boundaries, such that within each band between boundaries, the iris pattern is preserved. Here, two bands 802(1) and 802(3) are identical to that of FIG. 7, while the other two bands 802(2) and 802(4) are inverted or mirrored. In each band, the sensor pads have side edges that spiral about the center point outward from one intermediate boundary to the next.

As shown in FIG. 8, the resulting sensor pad layout defines a zigzag pattern in the vertical direction. When a user touches the sensor, two or three of the pads will generate capacitance signals used to determine the finger position. In FIG. 8, a user's finger (represented by dashed circle 804) contacts three pads A, B, and C, although predominantly on pad A.

Alternative Designs

The circular touch sensor may be implemented in any number of different ways. For instance, the pads may be arranged with different iris patterns that generate different capacitance values for various contact positions.

Figure 9:
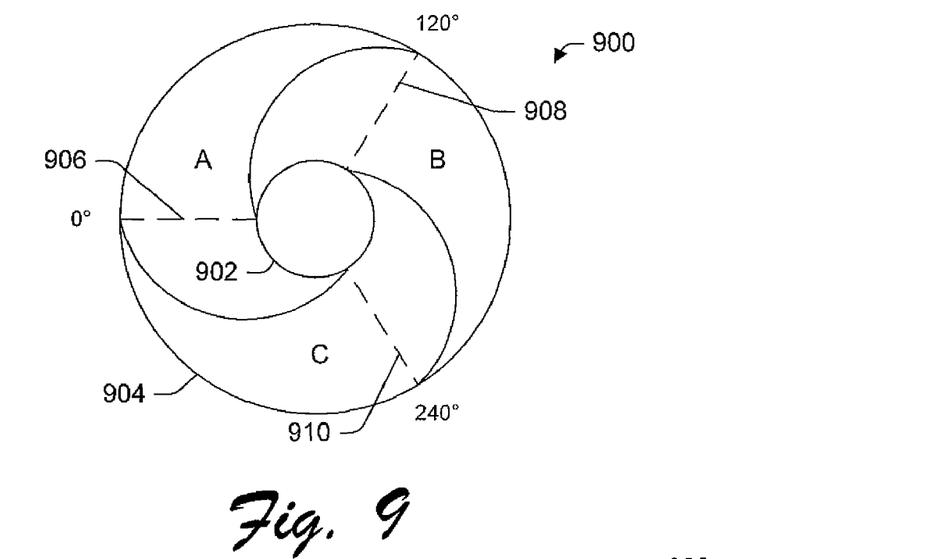
FIG. 9 illustrates a circular touch sensor having three sensor pads arranged according to a second implementation.

FIG. 9 shows a circular touch sensor 900 having three pads A, B, and C. In this example, each pad edge originates at a first point on the inner boundary 902 and terminates at a second point on the outer boundary 904, where the first and second points are approximately 120° apart. For instance, an edge separating pads A and B originates at a point on inner boundary 902 at 0° and terminates at a point on outer boundary 904 at 120°. As a result, there are contact positions that can be sensed by a single sensor, rather than two or more sensors. Notice that contact positioned along radial paths 906 (at 0°), 908 (at 120°), and 910 (at 240°) might be detected solely or predominantly by corresponding pads A, B, and C.

The interface 606 determines the contact position based on relative values generated by the capacitance meters 620-624 associated with the pads A-C. The interface 606 may use a table to look up contact position given the relative values, similar to that described above with respect to table 1.

As above, the interface 606 can interpolate between the positions using a table, such as one similar to table 1, to detect any number of finger positions on the circular touch sensor.

Figure 10:
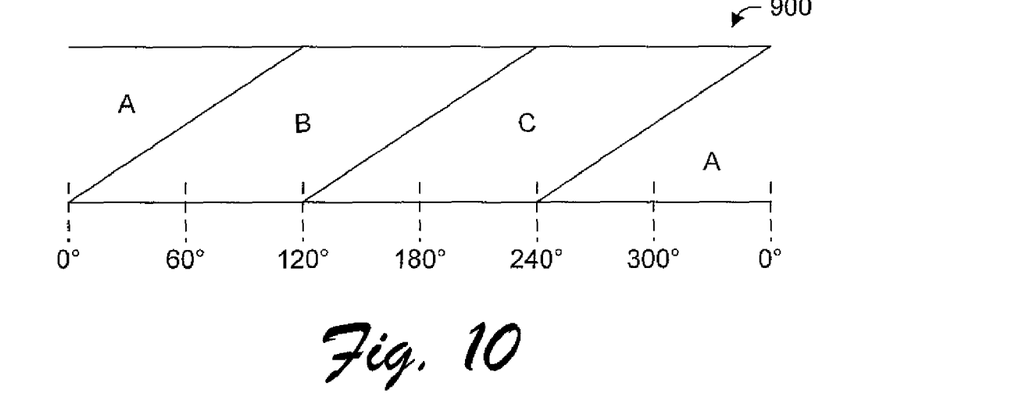
FIG. 10 illustrates the circular touch sensor of FIG. 9 as it would appear if uncoiled and stretched out linearly.

FIG. 10 shows the pads A-C of the circular touch sensor 900 when uncoiled and presented as a linear version. Notice that positions 0°, 120°, and 240° have no overlapping pads. Thus, unlike the layout of FIG. 7, at most only two pads are contacted at any one time. As contact occurs at various positions on the circular sensor, ratios of capacitance values generated by two adjoining pads are used to identify the contact location. The arcuate edges of the pads enable continuously changing ratios as the user's finger slides around the sensor, thereby allowing infinitely many detection locations. For instance, as the user slides her finger from 0° to 120°, the contribution value ratio of pad A to pad B varies continuously from 1:0 to 0:1.

Figure 11:
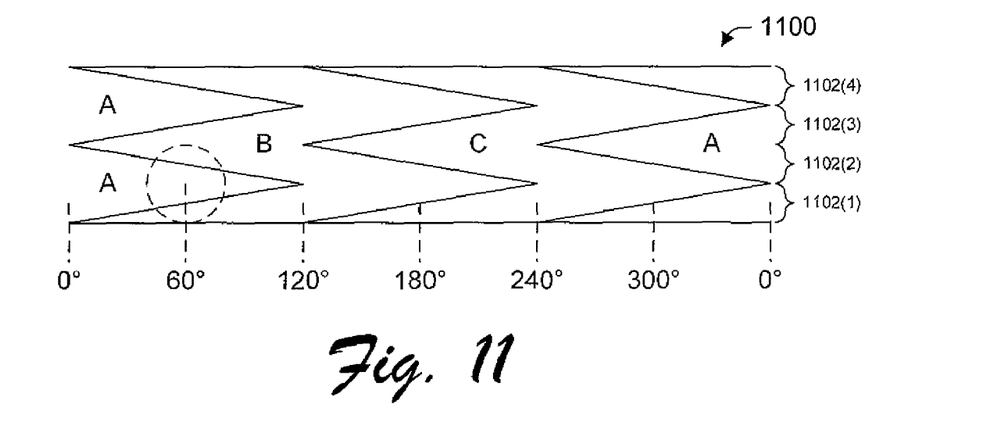
FIG. 11 illustrates a circular touch sensor in which the pad arrangement shown in FIG. 10 is replicated multiple times.

FIG. 11 shows a linear version of a circular sensor 900 where the iris pattern of three pads is repeated four times in the radial direction, as represented by horizontal bands 1102(1), 1102(2), 1102(3), and 1102(4). Two bands 1102(1) and 1102(3) are identical to that of FIG. 10, while the other two bands 1102(2) and 1102(4) are inverted or mirrored.

The sensors described above have three conductive pads. However, more than three conductive pads may be implemented in the circular touch sensor. More generally, the pad assembly for the touch sensors has N sensor pads arranged about a center point, where N≧3. Each sensor pad defines approximately 1/N of a contact region defined between the inner and outer boundaries.

Figure 12:
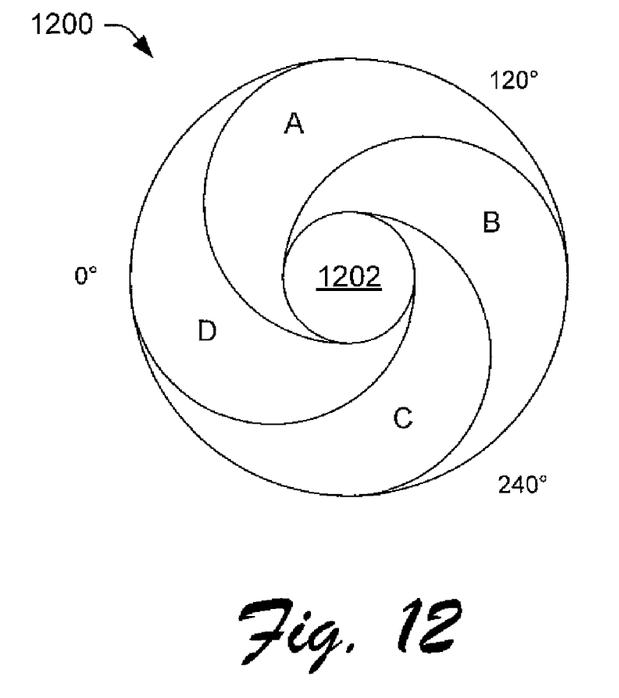
FIG. 12 illustrates a circular touch sensor having four sensor pads.

FIG. 12 shows an exemplary circular touch sensor 1200 having four pads A, B, C, and D arranged about a center region 1202. The pads A-D are arranged in a geometric iris-shaped pattern with continuous, arcuate edges spiraling outward from the center region 1202. In this arrangement, the sensor pads A-D overlap one another such that any radius from the sensor's center crosses over at least two sensor pads and more often over three sensor pads. In this manner, a user's finger is likely to contact two or three adjoining sensor pads at any point on the circular touch sensor 1200.

Figure 13:
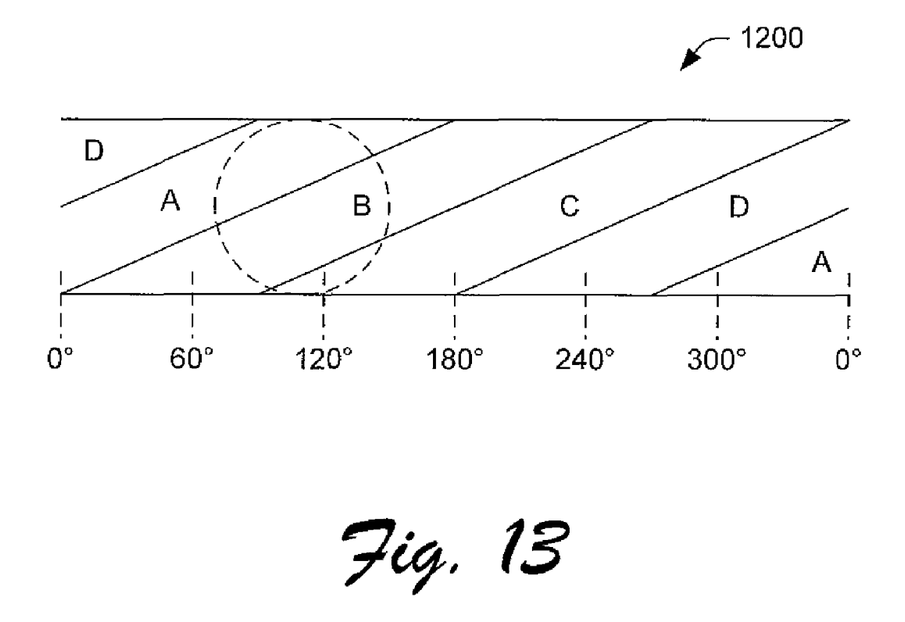
FIG. 13 illustrates the circular touch sensor of FIG. 12 as it would appear if uncoiled and stretched out linearly.

FIG. 13 shows the four pads A-D stretched out linearly. This illustration demonstrates the overlapping relationship of the four pads. At 60°, the contribution of pad B to the total increase above the base line is approximately ⅓ (0.333), the contribution of pad A is approximately ½ (0.500), and the contribution of pad D is approximately ⅙ (0.167).

Operation

Figure 14:
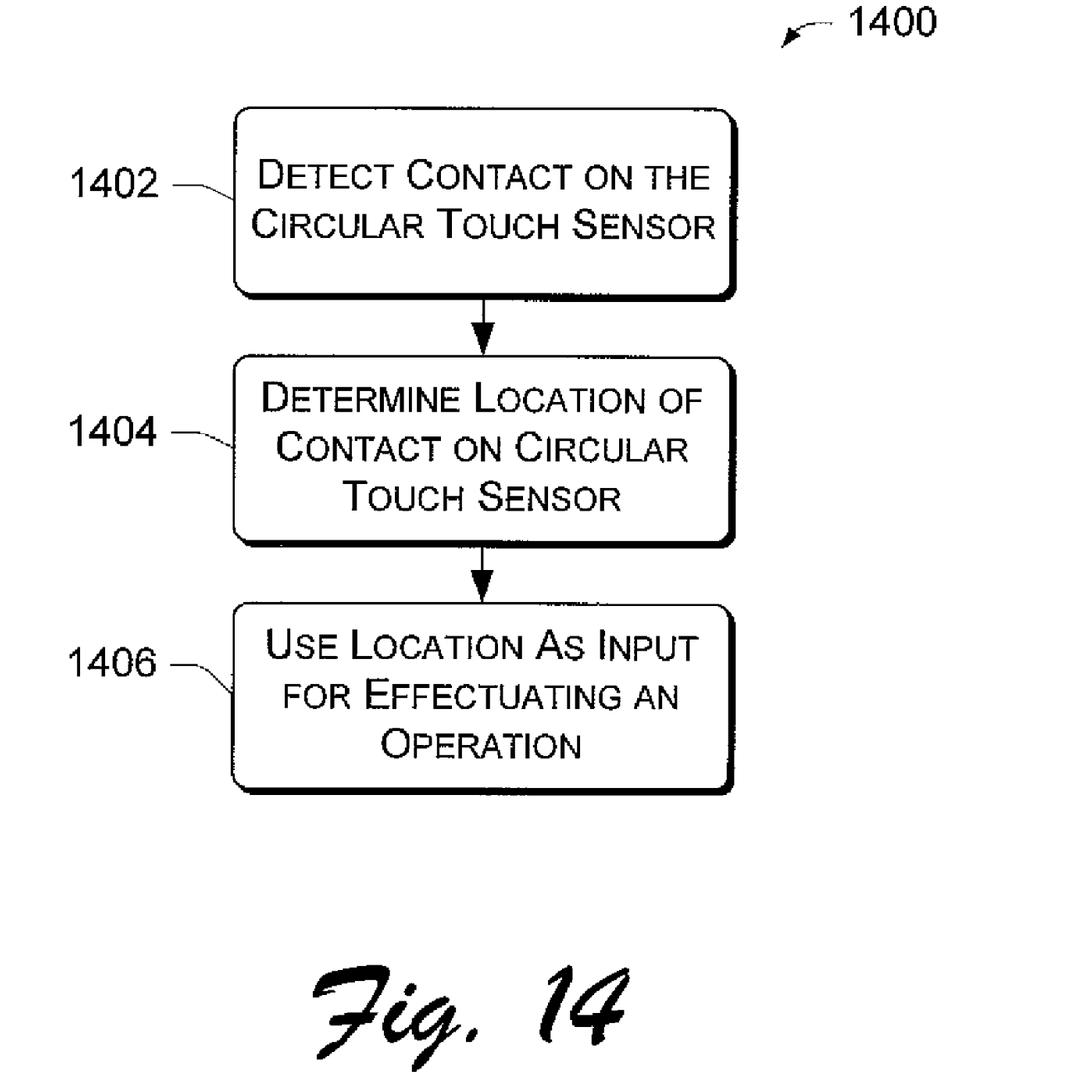
FIG. 14 is a flow diagram of a process for operating a circular touch sensor.

FIG. 14 shows a process 1400 for operating a circular touch sensor. The process 1400 is illustrated as a collection of blocks in a logical flow graph, which represent a sequence of operations that can be implemented in hardware, software, or combination thereof. In the context of software, the blocks represent computer instructions that, when executed by one or more processors, perform the recited operations. The computer instructions may be stored on computer readable storage media. Compute readable storage media includes volatile and nonvolatile, removable and non-removable media implemented in any tangible method. Computer readable storage media includes technology for storage of information such as computer readable instructions, data structures, programs modules or other data.

For discussion purposes, the process 1400 is described with reference to the system architecture 600 shown in FIG. 6. It is noted that the process 1400 may be implemented by other sensors and architectures.

At block 1402, contact on one or more pads of a circular touch sensor is detected. The contact may be from human touch, such as a finger, or a pointing device, such as a stylus or the like. In one implementation, the contact is detected by sensing capacitance change of one or more metal sensor pads, such as pads A, B, and C of sensor 506. The capacitance meters 620-624 sense the capacitance change and pass values indicative of capacitance (or capacitance change) to the interface 606.

At block 1404, a location of contact on the circular touch sensor is determined. With respect to system 600, the interface 606 and/or CPU 602 interpret the values from the capacitance meters to identify a precise location that the user touched the sensor 506. As one example, the interface 606 and/or CPU 602 computes a ratio among the two or more pads receiving the contact. The computation may involve use of a table, such as tables 1 or 2 above, and interpolation between values listed in the table. The ratio accurately identifies the location of contact on the circular sensor in terms of angular position.

At block 1406, the identified location of contact is used to effectuate an operation. For instance, the CPU 602 uses the location to ascertain a command intended by the user when contacting the circular touch sensor. Suppose, for example, that the device is operating in an audio player mode, and playback functions such as play, stop, skip ahead, and skip back are associated with locations on the circular sensor. When the user touches a position that aligns approximately with the "play" function, the CPU 602 understands the identified location as the user's instruction to initiate play of the song title.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for determining a location of a contact to a touch sensor comprising:
   detecting the contact to the touch sensor, the touch sensor comprising at least three adjoining sensor pads arranged about a common center point in an iris pattern, each sensor pad having at least one continuous, arcuate edge that spirals about outward from a first point on the common center point to a second point on an outer circular boundary such that the edges comprise the iris pattern and form an overlapping relationship amongst the sensor pads, wherein the first and second points are between approximately 120 and approximately 180 degrees apart and a curve of the continuous, arcuate edge is such that any radius from the common center point to the outer circular boundary crosses over at least two sensor pads;
   measuring a capacitance change in two or more of the sensor pads resulting from the contact;
   determining a continuously variable contact ratio for the two or more of the iris-shaped arcuate edged sensor pads based on a ratio of the capacitance change;
   assigning an angular position in accordance with the contact ratio by comparing the contact ratio to discrete angular positions residing in a lookup table; and
   corresponding sensor values in the lookup table to a plurality of discrete angular positions of contact, the touch sensor is correlated with a relative contribution of each of the sensor pads to a total capacitance increase across all of the sensor pads based on the overlapping relationship amongst the sensor pads, wherein the relative contribution of each of the sensor pads is represented as a percentage of the total capacitance increase, the total capacitance increase across all of the sensor pads equaling 100%.

2. The method of claim 1, further comprising interpolating between the discrete angular positions residing in the lookup table.

3. The method of claim 1, further comprising contacting the center point to input a selection.

4. A machine for determining a location of a contact to a touch sensor, the machine comprising:
a processor; and
a tangible memory coupled to the processor, containing computer-executable instructions that, when executed by the processor, direct the processor to perform the following acts comprising:
detecting the contact to a touch sensor, the touch sensor comprising at least three adjoining sensor pads arranged about a common center point in an iris pattern, each sensor pad having at least one continuous, arcuate edge that spirals about outward from a first point on the common center point to a second point on an outer circular boundary such that the edges comprise the iris pattern and form an overlapping relationship amongst the sensor pads, wherein the first and second points are between approximately 120 and approximately 180 degrees apart and a curve of the continuous, arcuate edge is such that any radius from the common center point to the outer circular boundary crosses over at least two sensor pads;
generating values indicative of the contact to two or more of the sensor pads;
determining a contact ratio based on a continuously variable ratio of the generated values indicative of the contact to the two or more of the iris-shaped arcuate edged sensor pads;
assigning an angular position in accordance with the contact ratio by comparing the contact ratio to discrete angular positions residing in a lookup table, and
corresponding sensor values in the lookup table to a plurality of discrete angular positions of contact, the touch sensor is correlated with a relative contribution of each of the sensor pads to a total contact increase across all of the sensor pads based on the overlapping relationship amongst the sensor pads, wherein the relative contribution of each of the sensor pads is represented as a percentage of the total contact increase, the total contact increase across all of the sensor pads equaling 100%.

5. The machine of claim 4, wherein detecting the contact comprises one or more of detecting a pressure change, a capacitance change, or a conductance change.

6. The machine of claim 4, wherein the values are generated by subtracting a sensed value from a baseline value, the sensed value resulting from the contact to one or more of the sensor pads.

7. The machine of claim 4, wherein the computer-executable instructions further comprise interpolating between the discrete angular positions residing in the lookup table.

8. A device comprising:
a touch sensor for detecting a contact, the touch sensor comprising at least three adjoining sensor pads arranged about a common center point in an iris pattern, each sensor pad having at least one continuous, arcuate edge that spirals about outward from a first point on the common center point to a second point on an outer circular boundary such that the edges comprise the iris pattern and form an overlapping relationship amongst the sensor pads, wherein the first and second points are between approximately 120 and approximately 180 degrees apart and a curve of the continuous, arcuate edge is such that any radius from the common center point to the outer circular boundary crosses over at least two sensor pads;
capacitance detection circuitry configured to generate values indicative of the contact to two or more of the sensor pads; and
a processor configured to:
calculate a continuously variable contact ratio for the two or more of the iris-shaped arcuate edged sensor pads based on a ratio of the generated values;
assign an angular position in accordance with the continuously variable contact ratio by comparing the continuously variable contact ratio to discrete angular positions residing in a lookup table; and
correspond the sensor values in the lookup table to a plurality of discrete angular positions of contact, the touch sensor is correlated with a relative contribution of each of the sensor pads to a total contact increase across all of the sensor pads based on the overlapping relationship amongst the sensor pads, wherein the relative contribution of each of the sensor pads is represented as a percentage of the total contact increase, the total contact increase across all of the sensor pads equaling 100%.

9. The device of claim 8, wherein detecting a contact comprises one or more of detecting a pressure change, a capacitance change, or a conductance change.

10. The device of claim 8, wherein the values are generated by subtracting a sensed value from a baseline value, the sensed value resulting from the contact to one or more of the sensor pads.

11. The device of claim 8, wherein the processor interpolates between the discrete angular positions residing in the lookup table.

* * * * *

UNITED STATES PATENT AND TRADEMARK OFFICE
CERTIFICATE OF CORRECTION

| | | Page 1 of 1 |
|---|---|---|
| PATENT NO. | : 7,786,981 B2 | |
| APPLICATION NO. | : 11/928524 | |
| DATED | : August 31, 2010 | |
| INVENTOR(S) | : David W. Proctor | |

It is certified that error appears in the above-identified patent and that said Letters Patent is hereby corrected as shown below:

In column 7, line 44, after "or" insert -- a --.

In column 7, line 53, delete "programs" and insert -- program --, therefor.

Signed and Sealed this
Tenth Day of May, 2011

David J. Kappos
*Director of the United States Patent and Trademark Office*